US012562091B2

(12) United States Patent
Chun et al.

(10) Patent No.: US 12,562,091 B2
(45) Date of Patent: Feb. 24, 2026

(54) DISPLAY DEVICE INCLUDING A DUMMY PIXEL CIRCUIT IN A NON-DISPLAY AREA AND DRIVING METHOD FOR THE SAME

(71) Applicant: Samsung Display Co., Ltd., Yongin-Si (KR)

(72) Inventors: Byung Ki Chun, Yongin-si (KR); Jae Hoon Lee, Yongin-si (KR); Tae Hyeong An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/199,372

(22) Filed: May 19, 2023

(65) Prior Publication Data

US 2023/0419873 A1 Dec. 28, 2023

(30) Foreign Application Priority Data

Jun. 27, 2022 (KR) ........................ 10-2022-0078462

(51) Int. Cl.
*G09G 3/20* (2006.01)
*G09G 3/3233* (2016.01)

(52) U.S. Cl.
CPC ......... *G09G 3/2007* (2013.01); *G09G 3/2096* (2013.01); *G09G 3/3233* (2013.01); *G09G 2300/0413* (2013.01); *G09G 2300/0842* (2013.01); *G09G 2320/0276* (2013.01);
(Continued)

(58) Field of Classification Search
None
See application file for complete search history.

(56) References Cited

U.S. PATENT DOCUMENTS 9,373,280 B2 6/2016 Yoon et al.
10,032,410 B2 7/2018 Takasugi et al.
(Continued)

FOREIGN PATENT DOCUMENTS

KR 10-1058111 B1 8/2011
KR 10-2019-0007662 A 1/2019
(Continued)

OTHER PUBLICATIONS

Dictionary.com definition of unit, 2025, p. 1 (Year: 2025).*

*Primary Examiner* — Kirk W Hermann
(74) *Attorney, Agent, or Firm* — Innovation Counsel LLP

(57) ABSTRACT

A display device comprising pixel circuits included in the display area, the pixel circuits including light emitting elements with grayscales corresponding to data input from the outside, a dummy pixel circuit included in the non-display area, the dummy pixel circuit including a dummy light emitting element and a dummy driving transistor, a sensing unit for inputting, to the dummy pixel circuit, a test data signal for sensing an output signal corresponding to predetermined test data for each predetermined time, and then performing an operation of generating compensation information for compensating for degradation according to a driving time of at least one of the light emitting element and the driving transistor based on the output signal output from the dummy pixel circuit, and a timing controller for accumulating and storing the compensation information, and generating compensated data by compensating for the data input from the outside.

20 Claims, 12 Drawing Sheets

(52) U.S. Cl.
CPC ... *G09G 2320/048* (2013.01); *G09G 2330/08* (2013.01); *G09G 2330/12* (2013.01)

(56) References Cited

U.S. PATENT DOCUMENTS

| | | | | |
|---|---|---|---|---|
| 2009/0079350 | A1* | 3/2009 | Osame | G09G 3/3258 315/169.3 |
| 2011/0069058 | A1 | 3/2011 | Chung et al. | |
| 2014/0062520 | A1* | 3/2014 | Kim | G09G 3/3225 324/762.01 |
| 2014/0176625 | A1* | 6/2014 | Yoon | G09G 3/3233 345/691 |
| 2017/0025061 | A1* | 1/2017 | Takizawa | G09G 3/3291 |
| 2018/0082621 | A1* | 3/2018 | Lin | G09G 3/2092 |
| 2018/0204492 | A1* | 7/2018 | Kuo | G09G 3/20 |
| 2021/0118369 | A1* | 4/2021 | Takasugi | G09G 3/3266 |
| 2021/0174727 | A1* | 6/2021 | Lee | G09G 3/2096 |
| 2021/0183283 | A1* | 6/2021 | Park | G09G 3/006 |
| 2022/0028311 | A1* | 1/2022 | Matsueda | G09G 3/3233 |
| 2022/0122540 | A1* | 4/2022 | Choi | G09G 3/3233 |

FOREIGN PATENT DOCUMENTS

| | | | | |
|---|---|---|---|---|
| KR | 20190007662 | A | * | 1/2019 |
| KR | 10-1992904 | B1 | | 6/2019 |
| KR | 10-2020-0012588 | A | | 2/2020 |
| KR | 20200012588 | A | * | 2/2020 |
| KR | 102210589 | B1 | * | 2/2021 |
| KR | 10-2281095 | B1 | | 7/2021 |

* cited by examiner

DISPLAY DEVICE INCLUDING A DUMMY PIXEL CIRCUIT IN A NON-DISPLAY AREA AND DRIVING METHOD FOR THE SAME

CROSS-REFERENCE TO RELATED APPLICATION

The present application claims priority under 35 U.S.C. § 119(a) to Korean patent application No. 10-2022-0078462 filed on Jun. 27, 2022 in the Korean Intellectual Property Office, the entire disclosure of which is incorporated herein by reference.

BACKGROUND

1. Technical Field

The present disclosure generally relates to a display device and a driving method of the same. More particularly, the present disclosure relates to a display device capable of sensing an accurate compensation value without noise in sensing for compensation according to driving time accumulation and a driving method of the same.

2. Related Art

With the development of information technologies, the importance of a display device which is a connection medium between a user and information increases. Accordingly, display devices such as a liquid crystal display device and an organic light emitting display device are increasingly used.

A display device may include a plurality of pixels therein, and each of the plurality of pixels may include a light emitting element and a driving transistor for driving the light emitting element. Electrical characteristics of the driving transistor and the light emitting element, which are included in each of the plurality of pixels, may become different from electrical characteristics before each pixel is driven due to degradation as driving time of each pixel is accumulated.

In order to compensate for an electrical characteristic difference between pixels according to driving time accumulation, there has been used a technique for calculating a compensation value by measuring an electrical characteristic degradation degree of each of a plurality of pixels for every certain time, and driving a display device by reflecting a compensation value for each pixel.

However, a sensing time and a sensing number of times may be limited so as to sense electrical characteristic degradation of each of all the pixels included in the display device. In addition, noise occurs in several voltages for driving the display device during a sensing operation, and therefore, it may not be easy to accurately measure a compensation value through only sensing with a limited number of times.

SUMMARY

Embodiments provide a display device capable of sensing an accurate compensation value without noise in sensing for compensation according to driving time accumulation.

In accordance with an aspect of the present disclosure, there is provided a display device including a display area and a non-display area, the display device including: pixel circuits included in the display area, the pixel circuits each including a light emitting element emitting light with a grayscale corresponding to data input from the outside; a dummy pixel circuit included in the non-display area, the dummy pixel circuit including a dummy light emitting element and a dummy driving transistor; a sensing unit configured to input, to the dummy pixel circuit, a test data signal for sensing an output signal corresponding to predetermined test data for each predetermined time, and then perform an operation of generating compensation information for compensating for degradation according to a driving time of at least one of the light emitting element and the driving transistor, based on the output signal output from the dummy pixel circuit; and a timing controller configured to accumulate and store the compensation information received from the sensing unit for each predetermined time, and generate compensated data by compensating for the data input from the outside according to the stored compensation information.

The sensing unit may include: a sensing controller configured to generate the test data signal and repeatedly provide the test data signal to the dummy pixel circuit by a predetermined number of times; a converter configured to receive the output signal from the dummy pixel circuit, and then generate a digital signal corresponding to the output signal by converting the output signal; and a comparator configured to generate information on a difference value between the digital signal and a predetermined reference value by comparing the digital signal with the reference value. The sensing controller receives, from the comparator, information on a plurality of difference values corresponding to the predetermined number of times, and generates the compensation information, based on the information on the plurality of difference values.

The dummy pixel circuit may be continuously driven corresponding to the grayscale and degraded while the display device is driven and wherein the sensing unit performs an operation of generating the compensation information on the dummy pixel circuit for each predetermined time.

The dummy pixel circuit may include a dummy switching transistor connected between a test data line to which the test data signal output from the sensing controller is transferred and a gate of the dummy driving transistor to transfer the test data signal to the gate of the dummy driving transistor, a storage capacitor connected between the gate of the dummy driving transistor and a first power source to store a voltage corresponding to the test data signal, and a sensing control transistor connected between an anode electrode of the dummy light emitting element and the sensing unit to transfer a voltage of the anode electrode of the dummy light emitting element as an output signal to the sensing unit. The dummy driving transistor may be connected between the first power source and an anode electrode of the light emitting element. A cathode electrode of the light emitting element may be connected to a second power source. The sensing unit may turn on the dummy switching transistor by applying a test scan signal to a gate of the dummy switching transistor when the operation of generating the compensation information is performed, to transfer the test data signal to the gate of the dummy driving transistor and the storage capacitor, and turn on the sensing control transistor by applying a sensing control signal to a gate of the sensing control transistor, to output the voltage of the anode electrode of the dummy light emitting element as an output signal to the sensing unit.

The display device may further include a data driver configured to generate a data signal, based on the compensated data received from the timing controller, and then provide the data signal to the pixel circuits.

The sensing unit may perform an operation of generating a plurality of test data signals respectively corresponding to a plurality of predetermined grayscale values and generating compensation information corresponding to each of the plurality of grayscale values.

The sensing controller may perform a calculation operation for generating the compensation information, based on the information on the plurality of difference values in the operation of generating the compensation information. The calculation operation may be accomplished by aligning information on a plurality of difference values corresponding to the predetermined number of times according to an order in which the information on the plurality of difference values are received from the comparator, forming a plurality of groups by sequentially selecting m difference values among the plurality of aligned difference values according to an order in which the m difference values are aligned, and deriving a median value among difference values included in each of the plurality of groups and then deriving an average value of median values respectively derived from the plurality of groups.

The non-display area may include a plurality of dummy pixel circuits. The sensing controller may perform the calculation operation on each of the plurality of dummy pixel circuits, and then generate the compensation information, based on a result obtained by performing the calculation operation on each of the plurality of dummy pixel circuits.

The timing controller may include a compensation information storage unit configured to store the compensation information received from the sensing unit, and generates the compensated data by compensating for the data input from the outside, based on the compensation information stored in the compensation information storage unit.

The dummy pixel circuit may be formed on the same substrate as the pixel circuits through the same process as the pixel circuits at the same time as the pixel circuits.

In accordance with another aspect of the present disclosure, there is provided a method for driving a display device including a display area including a plurality of pixel circuits and a non-display area including a dummy pixel circuit, the method including steps of: inputting, to the dummy pixel circuit, a test data signal for sensing an output signal corresponding to predetermined test data for each predetermined time; performing an operation of generating compensation information for compensating for degradation according to a driving time of at least one of a light emitting element and a driving transistor, which are included in each of the pixel circuits, based on the output signal output from the dummy pixel circuit; accumulating and storing the compensation information for each predetermined time, and generating compensated data by compensating for data input from the outside according to the stored compensation information; and allowing the light emitting element included in each of the pixel circuits to emit light with a grayscale corresponding to the compensated data.

The inputting of the test data signal may be accomplished by generating the test data signal and repeatedly providing the test data signal to the dummy pixel circuit by a predetermined number of times. The generating of the compensation information may be accomplished by generating the test data signal and repeatedly providing the test data signal to the dummy pixel circuit by a predetermined number of times, the generating of the compensation information may be accomplished by: generating a digital signal corresponding to the output signal output from the dummy pixel circuit by converting the output signal; generating information on a difference value between the digital signal and a predetermined reference value by comparing the digital signal with the reference value; and generating the compensation information, based on information on a plurality of difference values corresponding to the predetermined number of times.

The performing of the operation of generating the compensation information may be accomplished by: transferring the test data signal through the test data line; turning on the dummy switching transistor by applying a test scan signal to a gate of the dummy switching transistor, to store a voltage corresponding to the test data signal in the gate of the dummy driving transistor and the storage capacitor; and turning on the sensing control transistor by applying a sensing control signal to a gate of the sensing control transistor, to output a voltage of the anode electrode of the dummy light emitting element as a test_output signal.

The method may further include a step of generating a data signal, based on the compensated data and then providing the data signal to the pixel circuits.

The inputting of the test data signal maybe accomplished by: generating plurality of test data respectively corresponding to a plurality of predetermined grayscale values; and inputting a plurality of test data signals corresponding to the plurality of test data to the dummy pixel circuit. The generating of the compensated data may be accomplished by performing an operation of generating compensation information corresponding to each of the plurality of grayscale values, based on a plurality of output signals corresponding to each of the plurality of test data output from the dummy pixel circuit.

The generating of the compensation information may be accomplished by performing a calculation operation for generating the compensation information, based on the information on the plurality of difference values. The performing of the calculation operation maybe accomplished by: aligning information on a plurality of difference values corresponding to the predetermined number of times according to an order in which the information on the plurality of difference values are received; forming a plurality of groups by sequentially selecting m difference values among the plurality of aligned difference values according to an order in which the m difference values are aligned; deriving a median value among difference values included in each of the plurality of groups; and deriving an average value of median values respectively derived from the plurality of groups.

The generating of the compensation information may be accomplished by performing the calculation operation on each of the plurality of dummy pixel circuits, and then generating the compensation information, based on a result obtained by performing the calculation operation on each of the plurality of dummy pixel circuits. The generating of the compensated data includes generating the compensated data by compensating for the data input from the outside, based on the compensation information stored in a compensation information storage unit.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
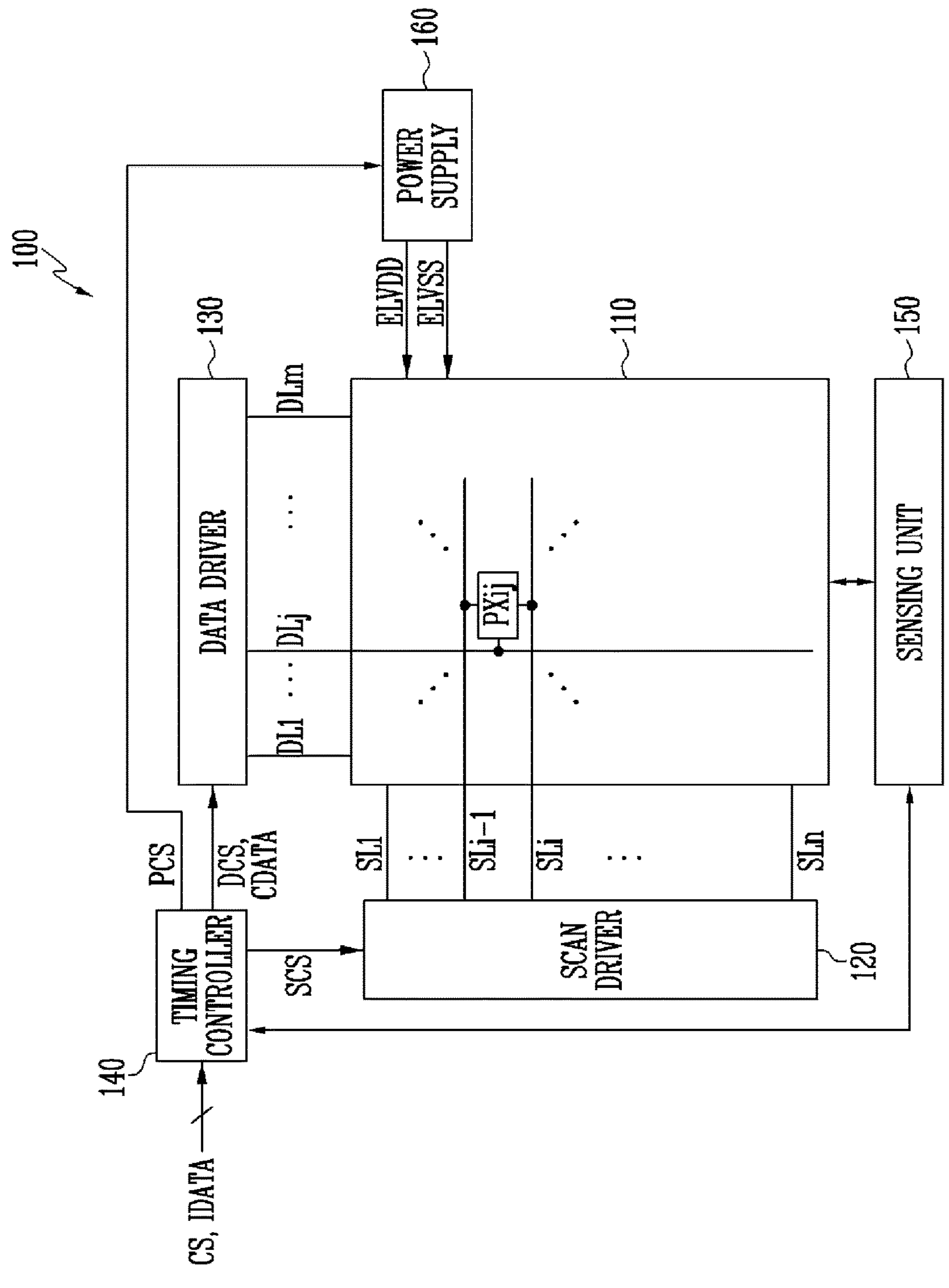
FIG. 1 is a block diagram of a display device in accordance with an embodiment of the present disclosure.

Hereinafter, embodiments are described in detail with reference to the accompanying drawings so that those skilled in the art may easily practice the present disclosure. The present disclosure may be implemented in various different forms and is not limited to the embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially' is omitted.

FIG. 1 is a block diagram of a display device in accordance with an embodiment of the present disclosure.

Referring to FIG. 1, the display device 100 in accordance with the embodiment of the present disclosure may include a pixel unit 110, a scan driver 120, a data driver 130, a timing controller 140, a sensing unit 150, and a power supply 160.

The display device 100 may be a flat panel display device, a flexible display device, a curved display device, a foldable display device, or a bendable display device. Also, the display device 100 may be applied to a transparent display device, a head-mounted display device, a wearable display device, and the like. Also, the display device 100 may be applied to various electronic devices including a smartphone, a tablet, a smart pad, a TV, a monitor, and the like.

Meanwhile, the display device 100 may be implemented as an organic light emitting display device, a liquid crystal display device, or the like. However, this is merely illustrative, and the configuration of the display device 100 is not limited thereto. For example, the display device 100 may be a self-luminous display device including an inorganic light emitting element.

The pixel unit 110 includes pixels PX located to be connected to data lines DL1 to DLm (m is a natural number) and scan lines SL1 to SLn (n is a natural number). The pixels PX may be supplied with a first power source ELVDD and a second power source ELVSS from the outside.

Meanwhile, although n scan lines SL1 to SLn are illustrated in FIG. 1, the present disclosure is not limited thereto. In an example, at least one control line, at least one scan line, at least one emission control line, at least one sensing line, and the like may be additionally formed corresponding to a circuit structure of the pixel PX.

In an embodiment, transistors included in the pixel PX may be implemented with an N-type oxide thin film transistor. For example, the oxide thin film transistor may be a Low Temperature Polycrystalline Oxide (LTPO) thin film transistor. However, this is merely illustrative, and the N-type transistors are not limited thereto. For example, an active pattern (semiconductor layer) included in the transistors may include an inorganic semiconductor (e.g., amorphous silicon or poly-silicon), an organic semiconductor, or the like. In addition, at least one of the transistors included in the display device 100 and/or the pixel PX may be replaced with a P-type transistor.

The timing controller 140 may generate a data driving control signal DCS, a scan driving control signal SCS, and a power driving control signal PCS, corresponding to synchronization signals supplied from the outside. The data driving control signal DCS generated by the timing controller 140 may be supplied to the data driver 130, the scan driving control signal SCS generated by the timing controller 140 may be supplied to the scan driver 120, and the power driving control signal PCS generated by the timing controller 140 may be supplied to the voltage supply 160.

Also, the timing controller 140 may supply compensated image data CDATA to the data driver 130, based on input image data IDATA. The input image data IDATA and the compensated image data CDATA may include grayscale information included in a grayscale range set in the display device 100.

A source start signal and clock signals may be included in the data driving control signal DCS. The source start signal may control a sampling start time of data. The clock signals may be used to control a sampling operation.

A scan start signal, a control start signal, and clock signals may be included in the scan driving control signal SCS. The scan start signal may control a timing of a scan signal. The control start signal may control a timing of a control signal. The clock signals may be used to shift the scan start signal and/or the control start signal.

The power driving control signal PCS may control supply and voltage levels of the first power source ELVDD and the second power source ELVSS.

In an embodiment, the timing controller 140 may further control an operation of the sensing unit 150. For example, the timing controller 140 may control the sensing unit 150 to perform a sensing operation for each predetermined time. The sensing operation may mean an operation of measuring a degradation degree of a dummy pixel circuit according to time and then compensating for input data, based on a measured result.

The scan driver 120 may receive the scan driving control signal SCS from the timing controller 140. The scan driver 120 supplied with the scan driving control signal SCS may supply a scan signal to the scan lines SL1 to SLn.

In an example, the scan driver 120 may sequentially supply the scan signal to the scan lines SL1 to SLn. When the scan signal is sequentially supplied to the scan lines SL1 to SLn, the pixels PX may be selected in units of horizontal lines. To this end, the scan signal may be set to a gate-on voltage (e.g., a logic high level) at which transistors included in the pixels PX can be turned on.

The data driver 130 may be supplied with the data driving control signal DCS and the compensated image data CDATA from the timing controller 140. The data driver 130 may supply a data signal for image display to the pixel unit 110, based on the compensated image data CDATA.

In an embodiment, the sensing unit 150 may provide a test data signal to a dummy pixel unit (not shown) for each predetermined time under the control of the timing controller 140. The test data signal may mean a signal corresponding to predetermined test data so as to compensate for an electrical characteristic change according to degradation of a plurality of pixel circuits included in the pixel unit 110 in the sensing operation. The test data may be predetermined as a value corresponding to each of a plurality of grayscales. In an embodiment, the sensing unit 150 may sequentially provide a plurality of test data signals corresponding to each of a plurality of grayscale values to the dummy pixel unit under the control of the timing controller 140. The sensing unit 150 may generate compensation information, based on an output signal received from the dummy pixel unit and then provide the generated compensation information to the timing controller 140. The compensation information may mean information for compensating for degradation according to a driving time of at least one of a light emitting element and a driving transistor.

Although a case where the sensing unit 150 is a component separate from the timing controller 140 is illustrated in FIG. 1, at least a partial configuration of the sensing unit 150 may be included in the timing controller 140. For example, the sensing unit 150 and the timing controller 140 may be formed as one driving IC.

The power supply 160 may supply a voltage of the first power source ELVDD and a voltage of the second power line ELVSS to the pixel unit 110, based on the power driving control signal PCS. In an embodiment, the first power source ELVDD may determine a voltage (e.g., a drain voltage) of a first electrode of the driving transistor, and the second power source ELVSS may determine a cathode voltage of the light emitting element.

Figure 2:
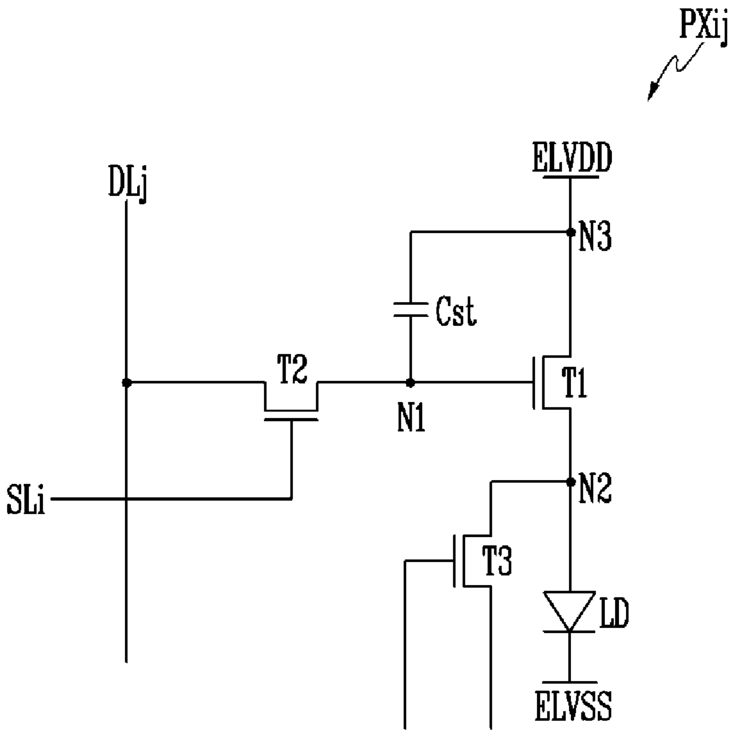
FIG. 2 is a diagram illustrating a pixel circuit in accordance with an embodiment of the present disclosure.

FIG. 2 is a diagram illustrating a pixel circuit in accordance with an embodiment of the present disclosure. However, FIG. 2 illustrates a pixel PXij located in an area in which an ith scan line and a jth data line intersect each other, and a configuration of each pixel PXij is not limited to the configuration shown in FIG. 2.

Referring to FIG. 2, the pixel PXij may include a driving transistor T1, a switching transistor T2, a storage capacitor Cst, and a light emitting element LD.

The driving transistor T1 may be connected between a terminal of a first power source ELVDD and the light emitting element LD, and a gate electrode of the driving transistor T1 may be connected to a first node N1. The driving transistor T1 may control an amount of current flowing from the first power source ELVDD to a second power source ELVSS via the light emitting element LD, corresponding to a voltage of the first node N1. In an embodiment, a voltage of the first power source ELVDD may be higher than a voltage of the second power source ELVSS.

The switching transistor T2 may be connected to a data line DLj and the first node N1, and a gate electrode of the switching transistor T2 may be connected to a scan line SLi. The switching transistor T2 may be turned on when a scan signal is supplied to the scan line SLi, to electrically connect the data line DLj and the first node N1 to each other. Accordingly, a data signal may be transferred to the first node N1.

The storage capacitor Cst may be connected between the first node N1 corresponding to the gate electrode of the driving transistor T1 and a third node corresponding to a first electrode of the driving transistor T1. The storage capacitor Cst may store a voltage corresponding to a voltage difference between the gate electrode and the first electrode of the driving transistor T1.

A first electrode (anode electrode or cathode electrode) of the light emitting element LD may be connected to a second electrode of the driving transistor T1, and a second electrode (cathode electrode or anode electrode) of the light emitting element LD may be connected to a terminal of the second power source ELVSS. The light emitting element LD may generate light with a predetermined luminance, corresponding to an amount of current (input current) supplied from the driving transistor T1.

The light emitting element LD may be selected as an organic light emitting diode. Also, the light emitting element LD may be selected as an inorganic light emitting diode such as a micro LED (light emitting diode) or a quantum dot light emitting diode. Also, the light emitting element LD may be an element configured with a combination of an organic material and an inorganic material. In FIG. 2, it is illustrated that the pixel PXij includes a single light emitting element LD. However, in another embodiment, the pixel PXij may include a plurality of light emitting elements LD, and the plurality of light emitting elements LD may be connected in series, parallel, or series/parallel to each other.

When a scan signal having a turn-on level (e.g., a logic high level) is applied, the switching transistor T2 is in a turn-on state. A voltage corresponding to a data signal applied to the data line applied to the data line DLj may be stored at the first node N1 (or storage capacitor Cst).

A driving current corresponding to a difference between a voltage of a first electrode of the storage capacitor Cst and a voltage of a second electrode of the storage capacitor Cst may flow between the first electrode and the second electrode of the driving transistor T1. Accordingly, the light emitting element LD may emit light with a luminance corresponding to the data signal.

In an embodiment, the pixel PXij may further include a sensing transistor T3 connected to a second node N2 between the second electrode of the driving transistor T1 and the first electrode of the light emitting element LD.

Components included in a dummy pixel circuit which will be described later may be identical to the components included in the pixel PXij. In an embodiment, a sensing operation is performed in only the dummy pixel circuit, and may not be performed in the pixels PX included in the pixel unit 110. Therefore, although the pixel PXij includes the sensing transistor T3, any signal may not be applied to a gate of the sensing transistor T3. Accordingly, the sensing transistor T3 may be maintained in a turn-off state.

Figure 3:
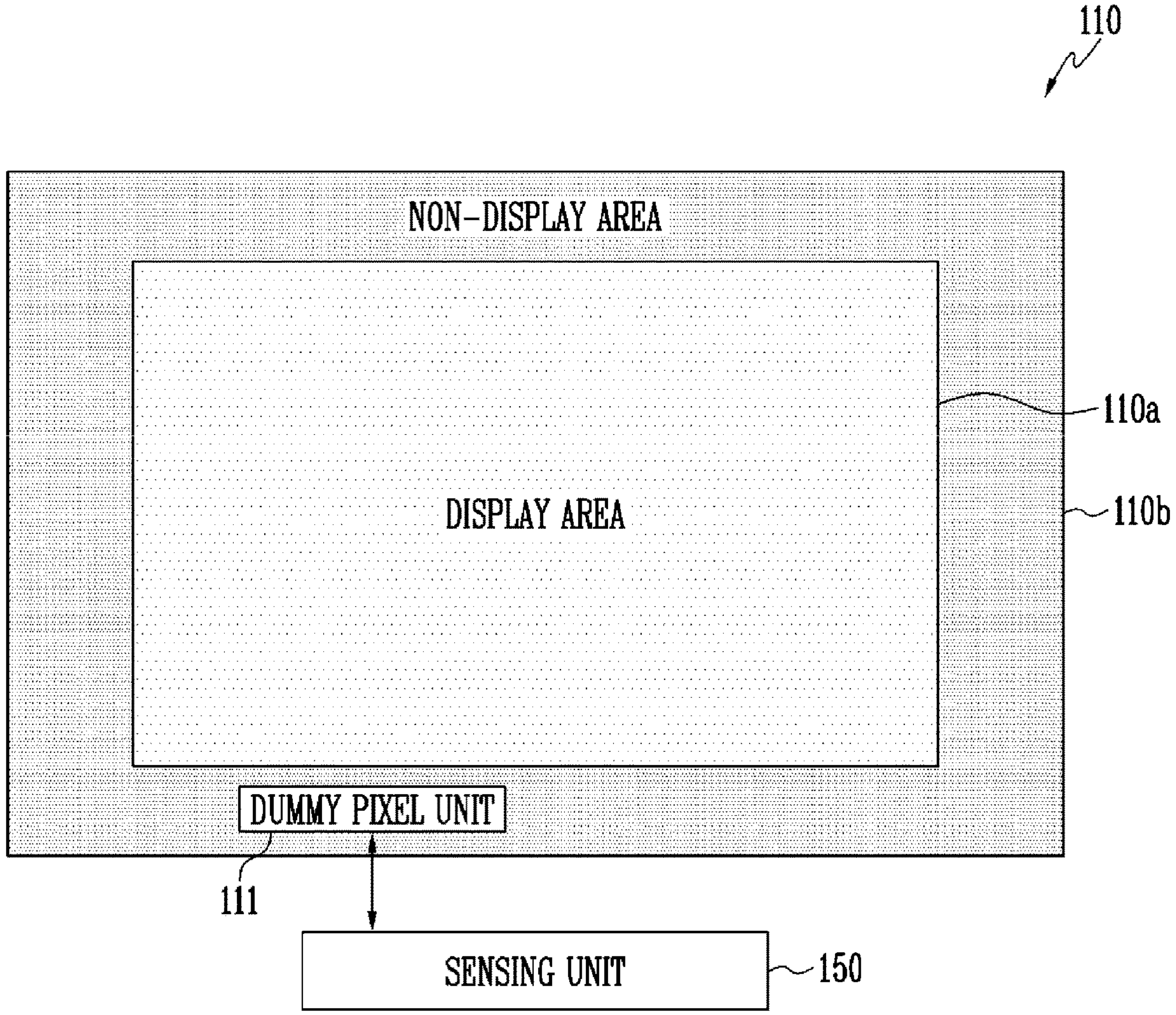
FIG. 3 is a diagram schematically illustrating a configuration of the display device in accordance with an embodiment of the present disclosure.

FIG. 3 is a diagram schematically illustrating a configuration of the display device in accordance with an embodiment of the present disclosure.

Referring to FIG. 3, the pixel unit 110 in the display device may include a display area 110*a* and a non-display area 110*b* located at the outside of the display area 110*a*.

In an embodiment, the display area 110*a* may be an area actually viewed by a user. That is, the display area 110*a* may be an area in which a plurality of pixels are arranged in a matrix form to each emit light with a luminance corresponding to actual input data under the control of the timing controller 140.

In an embodiment, the non-display area 110*b* may be an area which is not actually viewed by the user. For example, the non-display area 110*b* may be a bezel area covered by instruments. In an embodiment, the non-display area 110*b* may include at least one dummy pixel unit 111. The dummy pixel unit 111 may include at least one dummy pixel circuit including the same configuration as the pixel PX included in the display area 110*a*. The dummy pixel circuit may be formed on the same substrate as the pixels PX included in the display area 110*a* through the same process as the pixels PX at the same time as the pixels PX. Therefore, a degradation degree of electrical characteristics according to time with respect to components included in the dummy pixel circuit may be equal or very similar to a degradation degree of electrical characteristics according to time with respect to the components included in the pixel PX.

In an embodiment, the sensing unit 150 may provide a test signal for a sensing operation to the dummy pixel unit 111 for each predetermined time under the control of the timing controller 140. The test signal may include a test data signal and a test scan signal. The sensing unit 150 may receive, from the pixel unit 111, an output signal corresponding to test data provided to the dummy pixel unit 111. The sensing unit 150 may generate compensation information for compensating for input data, based on the output signal received from the dummy pixel unit 111.

Figure 4:
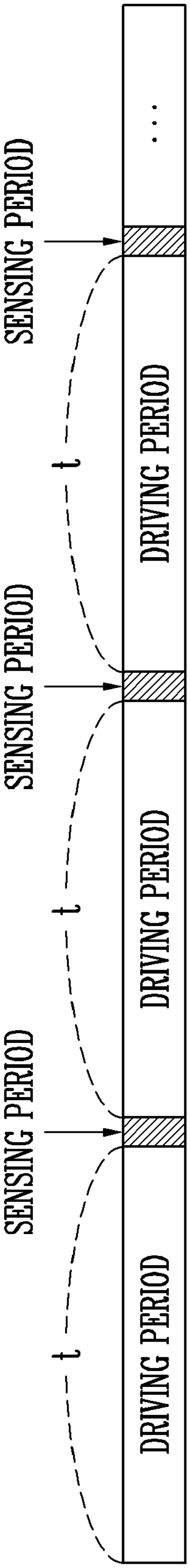
FIG. 4 is a diagram illustrating an operation of a dummy pixel unit while the display device is driven.

FIG. 4 is a diagram illustrating an operation of the dummy pixel unit while the display device is driven.

Referring to FIG. 4, the operation of the dummy pixel unit 111 may be divided into a driving period and a sensing period. The driving period may be a period in which the dummy pixel circuit included in the dummy pixel unit 111 is degraded while continuously emitting light with a luminance corresponding to a specific grayscale. The sensing period may be a period in which a degradation degree of the dummy pixel circuit included in the dummy pixel unit 111 is sensed by the sensing unit 150, and compensation information is generated based on a sensed result.

During the driving period, the dummy pixel circuit included in the dummy pixel unit 111 may be degraded while continuously emitting light under the timing controller 140. Specifically, the timing controller 140 may control the sensing unit 150 to allow the dummy pixel circuit to continuously emit light with a luminance corresponding to a specific grayscale during the driving period. The specific grayscale may be pre-set as a grayscale for degrading the dummy pixel circuit included in the dummy pixel unit 111. In an embodiment, the specific grayscale may be a white grayscale.

During the sensing period, the timing controller 140 may control the sensing unit 150 to generate compensation information according to a degree to which the dummy pixel circuit is degraded. The sensing period may be repeated for every predetermined time. For example, referring to FIG. 4, the sensing period may be repeated for every time t FIG. 5 is a block diagram illustrating in detail a sensing operation performed in the sensing period in accordance with an embodiment of the present disclosure.

Figure 5:
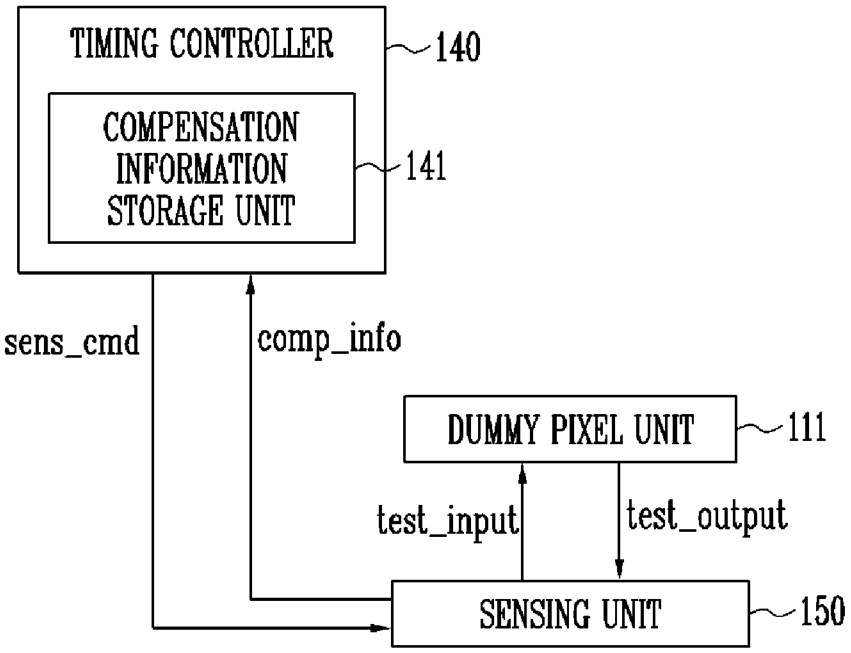
FIG. 5 is a block diagram illustrating in detail a sensing operation performed in a sensing period in accordance with an embodiment of the present disclosure.

Referring to FIG. 5, the timing controller 140 may provide a sensing command sens_cmd to the sensing unit 150 for each predetermined time. The sensing command sens_cmd may be a command for generating compensation information by sensing a degradation degree of the dummy pixel circuit included in the dummy pixel unit 111. The sensing unit 150 may provide a test_input signal test_input to the dummy pixel unit 111, corresponding to the sensing command sens_cmd. The test_input signal test_input may include a test data signal and a test scan signal. The dummy pixel unit 111 may provide the sensing unit 150 with a test output signal test_output corresponding to the received test_input signal test_input in response to the test_input signal test_input. The sensing unit 150 may generate compensation information comp_info, based on the test output signal test_output provided from the dummy pixel unit 111 and then provide the generated compensation information comp_info to the timing controller 140. The timing controller 140 may store the compensation information comp_info received from the sensing unit 150 to a compensation information storage unit 141.

Figure 6A:
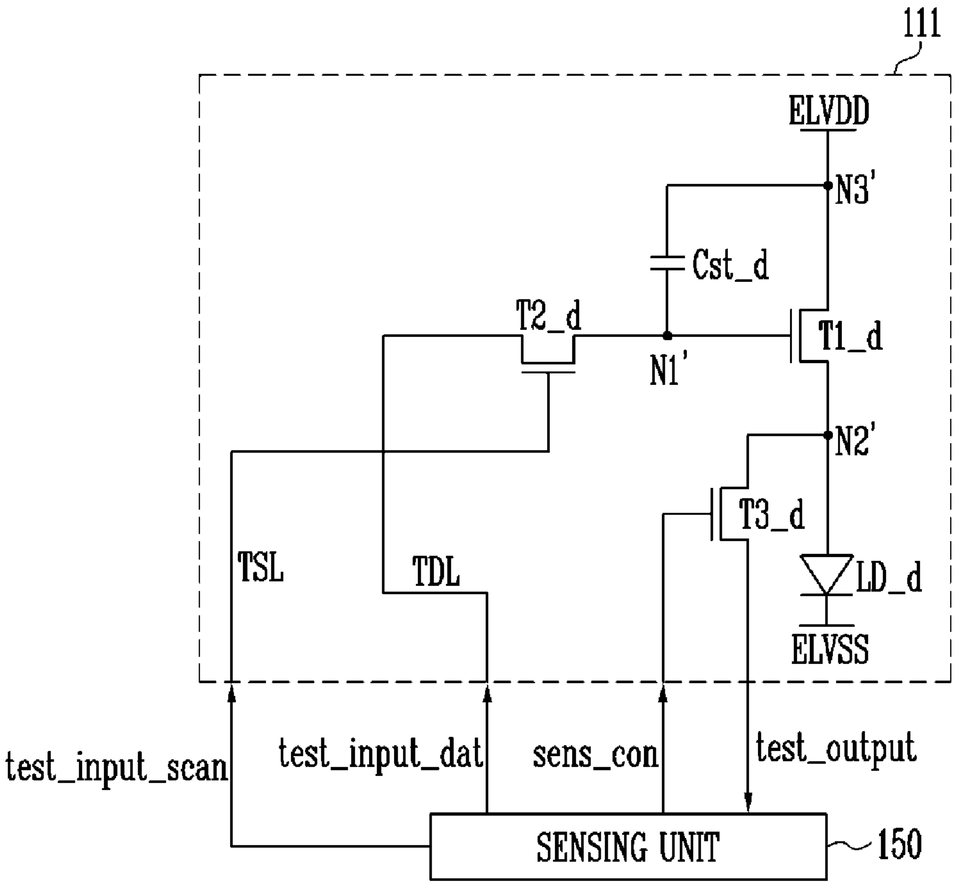
FIGS. 6A and 6B are diagrams illustrating in detail operations of the sensing unit and the dummy pixel circuit in a sensing operation in accordance with an embodiment of the present disclosure.
Figure 6B:
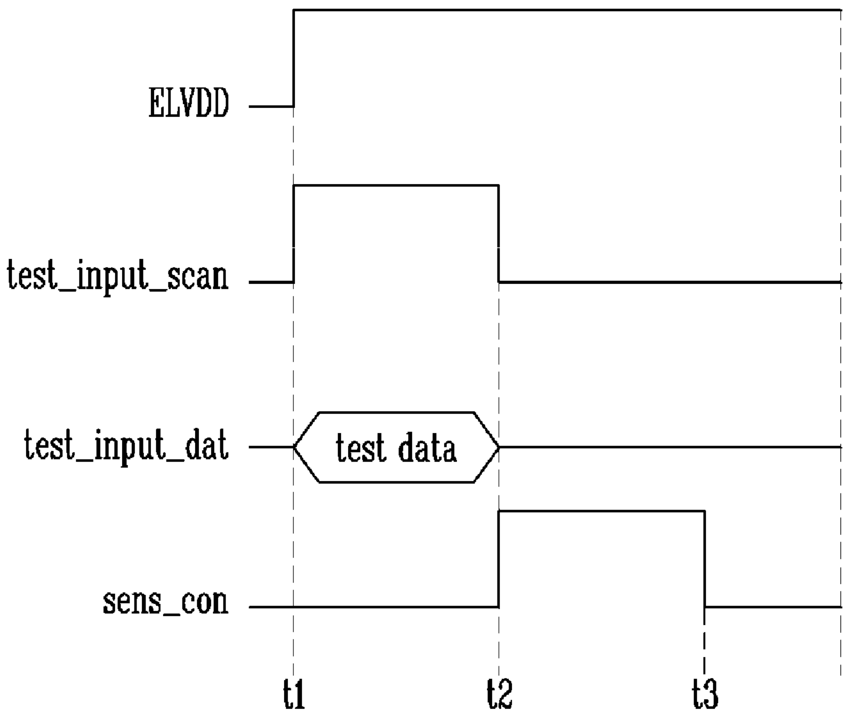

FIGS. 6A and 6B are diagrams illustrating in detail operations of the sensing unit and the dummy pixel circuit in a sensing operation in accordance with an embodiment of the present disclosure.

Referring to FIG. 6A, the dummy pixel unit 111 may comprise a dummy pixel circuit including a plurality of transistors and a plurality of light emitting elements. In an embodiment, the dummy pixel circuit may be formed on the same substrate as the pixel PX described in FIG. 2 through the same process as the pixel PX at the same time as the pixel PX.

The dummy pixel circuit may include a dummy driving transistor T1_*d*, a dummy switching transistor T2_*d*, a dummy storage capacitor Cst_d, and a dummy light emitting element LD_d. In an embodiment, the dummy light emitting element LD_d may not emit light in the driving period. Therefore, the dummy light emitting element LD_d in accordance with the present disclosure may be replaced with a resistive element having the same resistance value. Additionally, since the dummy pixel unit 111 is located in the non-display area 110*b*, light may not be recognized by the user even when the dummy light emitting element LD_d emits light during the driving period.

The dummy pixel circuit may further comprise a sensing control transistor T3_*d* for controlling the sensing operation. A first electrode of the sensing control transistor T3_*d* may be connected to an anode electrode of the dummy light emitting element LD_d, and a second electrode and a gate of the sensing control transistor T3_*d* may be connected to the sensing unit 150. The dummy pixel circuit may further comprise a test data line TDL to which a test data signal test_input_dat output from the sensing unit 150 is transferred and a test scan line TSL to which a test scan signal test_input_scan is output. Descriptions of components identical or corresponding to the components included in the pixel circuit described in FIG. 2 will be omitted.

In an embodiment, the sensing unit 150 may perform the sensing operation, corresponding to the sensing command of the timing controller 140.

Specifically, referring to FIGS. 6A and 6B, at t1, the sensing unit 150 may provide the test data signal test_input_dat to a first electrode of the dummy switching transistor T2_*d*. The test data signal test_input_dat may be pre-set as a value corresponding to any one grayscale among a plurality of grayscales which the display device can express. At t1, the sensing unit 150 may provide the test scan signal test_input_scan to a gate of the dummy switching transistor T2_*d*. When the test scan signal test_input_scan is provided to the gate of the dummy switching transistor T2_*d*, the dummy switching transistor T2_*d* may be turned on. At t1, the first power source ELVDD having a high level may be applied and then maintained.

The test data signal test_input_dat is provided to the first electrode of the dummy switching transistor T2_*d*, and the test scan signal test_input_scan is provided to the gate of the dummy switching transistor T2_*d*, so that a first node N1' may be charged with a voltage corresponding to the test data signal test_input_dat.

After the first node N1' is charged, at t2, the supply of the test scan signal test_input_scan and the test data signal test_input_dat may be suspended. Therefore, the dummy switching transistor T2_*d* may be turned off, and the first node N1' may be floated. A current having a magnitude corresponding to the test data signal test_input_dat may flow toward the anode electrode of the dummy light emitting element LD_d via the dummy driving transistor T1_*d* from the terminal of the first power source ELVDD.

At t2, the sensing unit 150 may provide a sensing control signal sens_con to the gate of the sensing control transistor T3_*d*. When the sensing control signal sens_con is applied to the gate of the sensing control transistor T3_*d*, the sensing control transistor T3_*d* may be turned on. A voltage of a second node N2' may be transferred as a test output signal test_output to the sensing unit 150.

At t3, the supply of the sensing control signal sens_con may be suspended.

The sensing unit 150 may generate compensation information, based on the test output signal test_output output from the dummy pixel unit 111.

The sensing operation described in FIGS. 6A and 6B may be performed by a predetermined number of times on the same test data signal test_input_dat. That is, the display device in accordance with the embodiment of the present disclosure may repeatedly perform the sensing operation by the predetermined number of times on the same test data signal test_input_dat and then perform a calculation operation which will be described later on output values, thereby removing noise which may occur in the sensing operation.

The sensing operation described in FIGS. 6A and 6B may be performed on a plurality of grayscales. That is, the display device in accordance with the embodiment of the present disclosure may provide the dummy pixel unit 111 with a test data signal corresponding to each of a plurality of grayscales which the display device can express, thereby generating compensation information corresponding to each of the plurality of grayscales.

Figure 7:
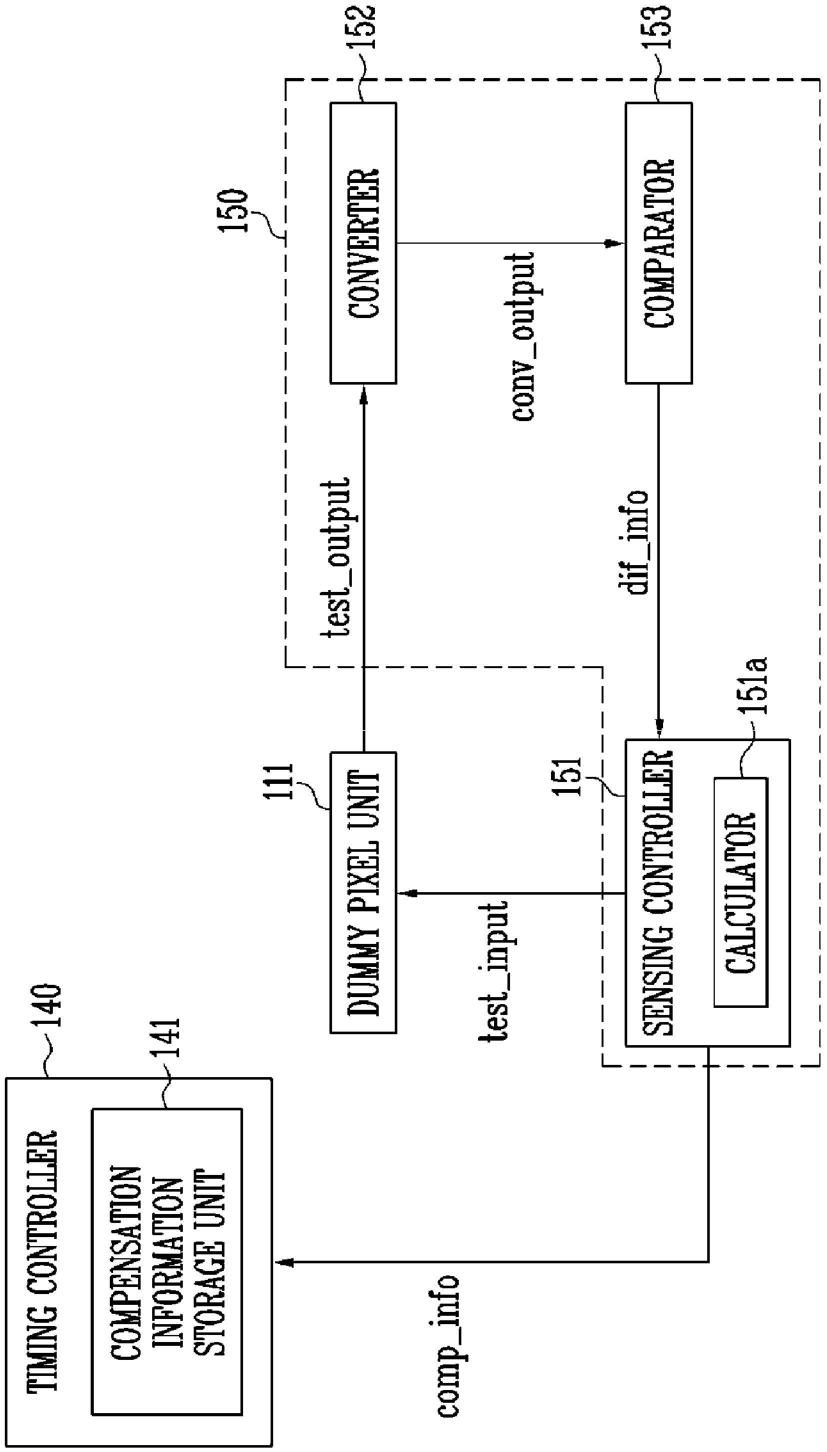
FIG. 7 is a diagram illustrating in detail a sensing operation in accordance with an embodiment of the present disclosure.

FIG. 7 is a diagram illustrating in detail a sensing operation in accordance with an embodiment of the present disclosure.

Referring to FIG. 7, the sensing unit 150 may include a sensing controller 151, a converter 152, and a comparator 153.

Specifically, the sensing controller 151 may generate a test_input signal test_input, and repeatedly provide the test_input signal test_input to the dummy pixel unit 111 by a predetermined number of times. The test_input signal test_input may include a test data signal and a test scan signal.

The dummy pixel unit 111 may provide the converter 152 with a test output signal test_output corresponding to the input test data signal. The test output signal test_output may correspond to the voltage of the second node N2' shown in FIG. 6A. The test output signal test_output may be an analog signal.

After the converter 152 receives the test output signal test_output from the dummy pixel unit 111, the converter 152 may convert the test output signal test_output, thereby generating a digital signal conv_output corresponding to the test output signal test_output. In an embodiment, the converter 152 may include an analog-digital converter. The converter 152 may provide the digital signal conv_output to the comparator 153.

The comparator 153 may compare the digital signal conv_output provided from the converter 152 with a predetermined reference value, and generate information dif_info on a difference value between the digital signal conv_output and the reference value. In an embodiment, the reference value may be data obtained by converting the test output signal test_output with respect to a test_input signal corresponding to a specific grayscale into a digital signal when the dummy pixel circuit is not degraded. The reference value may be predetermined with respect to each of a plurality of grayscale values which the display device can express. Reference values respectively corresponding to the plurality of grayscale values may be stored in a separate register (not shown) included in the sensing unit 150 before the display device is released. The comparator 153 may provide the information dif_info on the difference value to the sensing controller 151.

The sensing controller 151 may receive, from the comparator 153, information dif_info on a plurality of difference values corresponding to the predetermined number of times. The sensing controller 151 may generate compensation information comp_info, based on the information dif-info on the plurality of difference values. Specifically, a calculator 151*a* included in the sensing controller 151 may generate the compensation information comp_info by performing a calculation operation for removing noise among the plurality of difference values. The sensing controller 151 may provide the generated compensation information comp_info to the timing controller 140.

An operation of generating the compensation information comp_info may be performed on each of the plurality of grayscales which the display device can express.

Figure 8A:
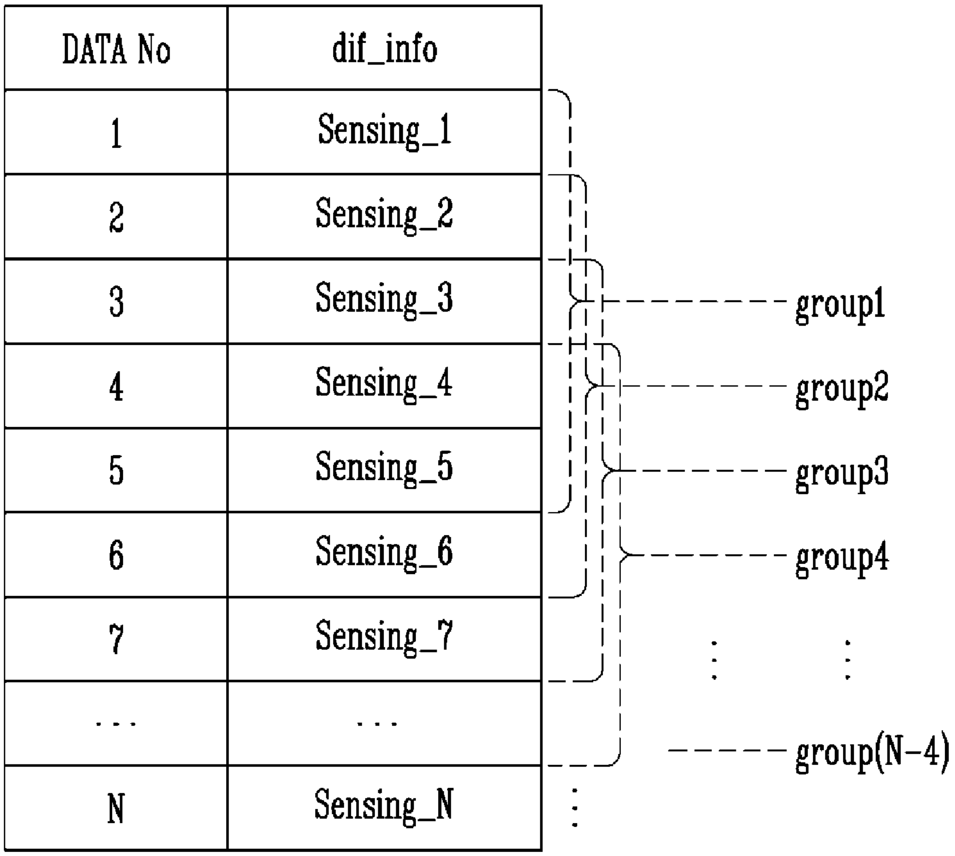
FIG. 8A is a diagram illustrating a calculation operation in accordance with an embodiment of the present disclosure.

FIG. 8A is a diagram illustrating a calculation operation in accordance with an embodiment of the present disclosure.

Referring to FIGS. 7 and 8A, the calculator 151*a* included in the sensing controller 151 may perform a calculation operation on a plurality of difference values received from the comparator 153. Specifically, the calculator 151 may include at least one median filter and at least one average filter. Specifically, the calculator 151*a* may select a predetermined number of difference values among the plurality of difference values received from the comparator 153, and perform a first calculation operation of deriving a median value of the selected difference values. The first calculation operation may be repeatedly performed by a predetermined number of times on a plurality of difference values. Each of the plurality of difference values may be repeatedly selected, and be selected at least once.

After the calculator 151 performs the first calculation operation by the predetermined number of times, the calculator 151 may perform a second calculation operation of deriving an average value of a plurality of median values. The sensing controller 151 may determine the average value of the plurality of median values, which is derived after the second calculation operation is completed, as compensation information comp_info on a corresponding grayscale.

In an embodiment, the sensing controller 151 may receive information dif_info on N difference values from the comparator 153. The calculator 151*a* may align difference values Sensing_1 to Sensing_N from 1 to N according to an order in which the difference values Sensing_1 to Sensing_N are received from the comparator 153. The calculator 151*a* may form a plurality of groups group1 to group(N−4) by sequentially selecting 5 difference values among the plurality of aligned difference values Sensing_1 to Sensing_N according to an order in which the 5 difference values are aligned. The difference values may be repeatedly selected. However, for convenience of description, the number of selected difference values is determined as 5. The number of difference values is not limited by the embodiment.

The calculator 151*a* may derive a median value among difference values included in each of the plurality of groups group1 to group(N−4) (first calculation operation). For example, when Sensing_1, Sensing_2, Sensing_3, Sensing_4, and Sensing_5, which are included in group 1, respectively have 3, 1, 2, 5, and 4 difference values, the median value may be derived as 3. For example, when Sensing_2, Sensing_3, Sensing_4, Sensing_5, and Sensing_6, which are included in group 2, respectively have 1, 2, 5, 4, and 7 difference values, the median value may be derived as 4.

The calculator 151*a* may derive an average value of a plurality of median values respectively derived from the plurality of groups group1 to group(N−4) (second calculation operation).

The sensing controller 151 may determine, as compensation information comp_info, an average value derived after the second calculation operation is completed. The sensing controller 151 may provide the compensation information comp_info to the timing controller 140.

Figure 8B:
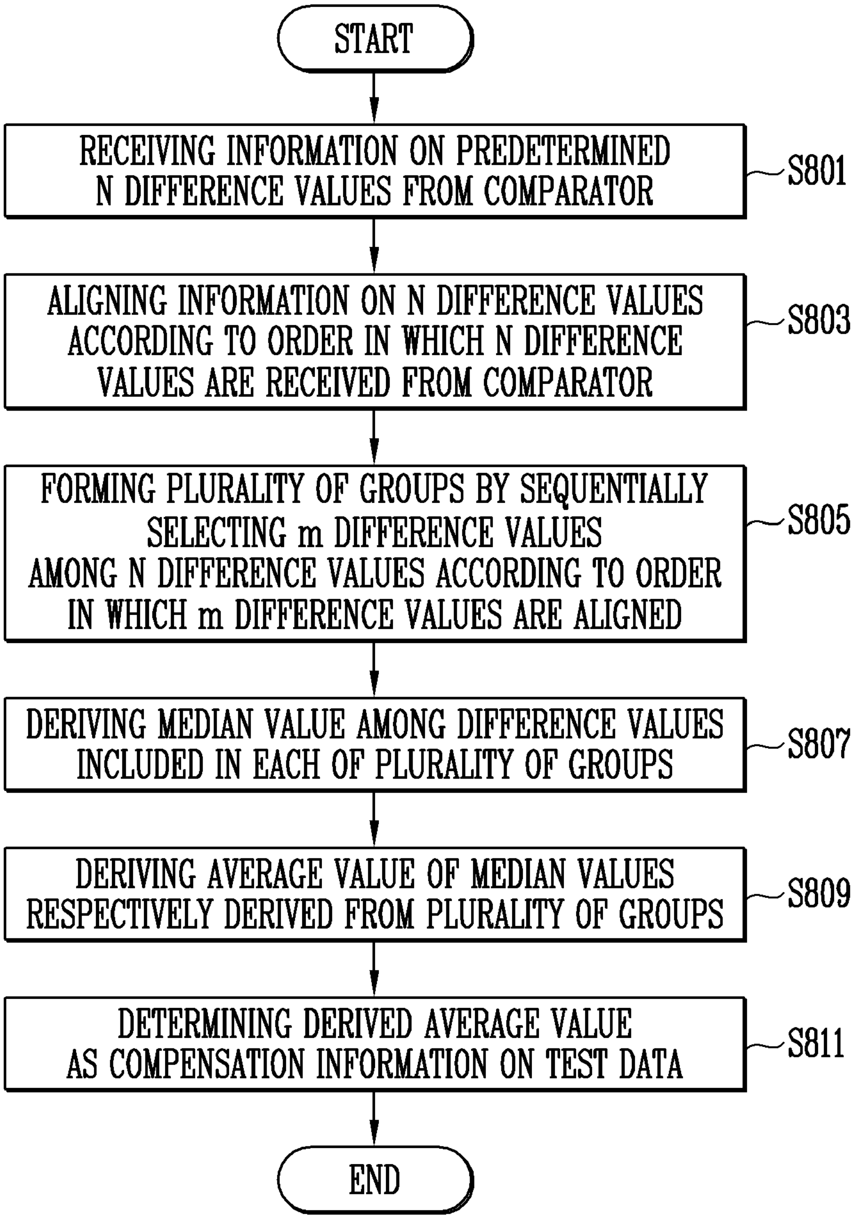
FIG. 8B is a flowchart illustrating a calculation operation in accordance with an embodiment of the present disclosure.

FIG. 8B is a flowchart illustrating a calculation operation in accordance with an embodiment of the present disclosure.

In step S801, the sensing controller 151 may receive information on predetermined N difference values from the comparator.

In step S803, the sensing controller 151 may align information on the N difference values according to an order in which the N difference values are received from the comparator.

In step S805, the sensing controller 151 may form a plurality of groups by sequentially selecting m difference value among the N difference values according to an order in which the m difference values are aligned. Each of the plurality of difference values may be repeatedly selected, and be selected at least once.

In step S807, the sensing controller 151 may derive a median value among difference values included in each of the plurality of groups.

In step S809, the sensing controller 151 may derive an average value of median values respectively derived from the plurality of groups.

In step S811, the sensing controller 151 may determine the derived average value as compensation information on test data.

Figure 9:
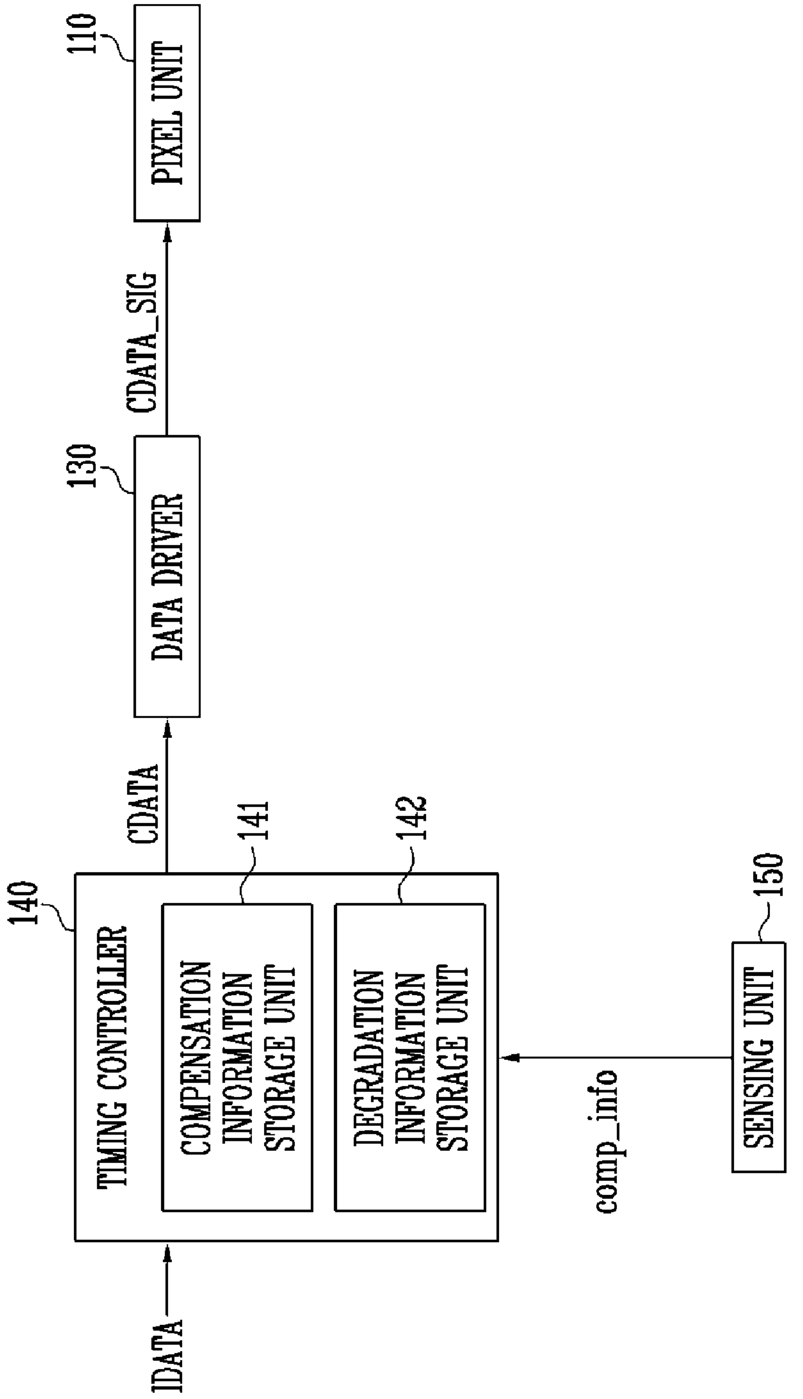
FIG. 9 is a block diagram illustrating a data compensation operation in accordance with an embodiment of the present disclosure.

FIG. 9 is a block diagram illustrating a data compensation operation in accordance with an embodiment of the present disclosure.

Referring to FIG. 9, the sensing unit 150 may provide the timing controller 140 with compensation information comp_info derived during the sensing operation described with reference to FIGS. 5, 6A, 6B, 7, 8A, and 8B. In an embodiment, the sensing unit 150 may perform the sensing operation for each predetermined time under the control of the timing controller 140 and then provide the compensation information comp_info to the timing controller 140.

The timing controller 140 may include a compensation information storage unit 141 for storing the compensation information comp_info. The timing controller 140 may provide the compensation information storage unit 141 with the compensation information comp_info received from the sensing unit 150.

In an embodiment, the compensation information storage unit 141 may store compensation information corresponding to each of a plurality of grayscales. Specifically, the timing controller 140 may drive a plurality of compensated grayscale values corresponding to each of the plurality of grayscales (e.g., 0 to 255), based on the compensation information comp_info received from the sensing unit 150, and store the plurality of compensated grayscale values in the compensation information storage unit 141. The timing controller 140 may receive the compensation information comp_info from the sensing unit 150 for each predetermined time and then store compensated grayscale values corresponding to a degradation degree in the compensation information storage unit 141. This may mean that as the degradation degree becomes larger, degradation of a pixel circuit (or dummy pixel circuit) is made much more.

In an embodiment, the timing controller 140 may further include a degradation information storage unit 142 including information on that each of the plurality of pixels included in the pixel unit 110 is degraded. The timing controller 140 may derive degradation information as information on a degree to which each pixel is degraded, based on information on input image data IDATA received from the outside and/or information on compensated data CDATA, and store the degradation information in the degradation information storage unit 142. The degradation information may be accumulated information of degradation degrees of each pixel from a time at which the display device initially operates to a recent update time. For example, as each pixel has a higher grayscale and is used for a longer time, a degradation degree of the corresponding pixel may become larger. On the other hand, as each pixel has a lower grayscale and is used for a shorter time, a degradation degree of the corresponding pixel may become smaller. For example, a degradation degree AGE[n] in an nth image frame of a specific pixel included in the pixel unit 110 may be derived as follows.

$$AGE[n]=AGE[n-1]+CDAs[n] \quad \text{Equation 1}$$

AGE[n−1] of a specific pixel may be degradation information AGE [n−1] obtained by accumulating degradation amounts from a first image frame to an (n−1)th image frame. AGE[n] may be degradation information AGE[n] obtained by accumulating degradation amounts from a first image frame to an nth image frame of the specific pixel. Here, n is an integer greater than 1. CDAs[n] may be a current degradation amount CDAs[n] calculated based on information on input grayscales of the nth image frame of the specific pixel. In an embodiment, the current degradation amount CDAs[n] may include information on a ratio of an input grayscale of the nth image frame of the specific pixel to a maximum input grayscale (e.g., 255).

That is, the degradation degree AGE[n] in the nth image frame of the specific pixel may be derived by reflecting the current degradation amount CDAs[n] including the information on the input grayscale in the nth image frame to an accumulated degradation degree AGE[n−1] in a previous frame.

In an embodiment, the timing controller 140 may receive input image data IDATA from the outside. The timing controller 140 may generate compensated data CDATA by compensating for the input image data IDATA input from the outside, based on the compensation information comp_info stored in the compensation information storage unit 141 and the degradation information for each pixel, which is stored in the degradation information storage unit 142. The timing controller 140 may provide the compensated data CDATA to the data driver 130. The data driver 130 may generate data signals CDATA_SIG to be supplied to the respective pixels included in the display device, based on the compensated data CDATA.

Each of the plurality of pixels included in the pixel unit 110 may emit light with a luminance corresponding to a compensated data signal CDATA_SIG received from the data driver 130 at a predetermined time under the control of the timing controller 140.

Figure 10:
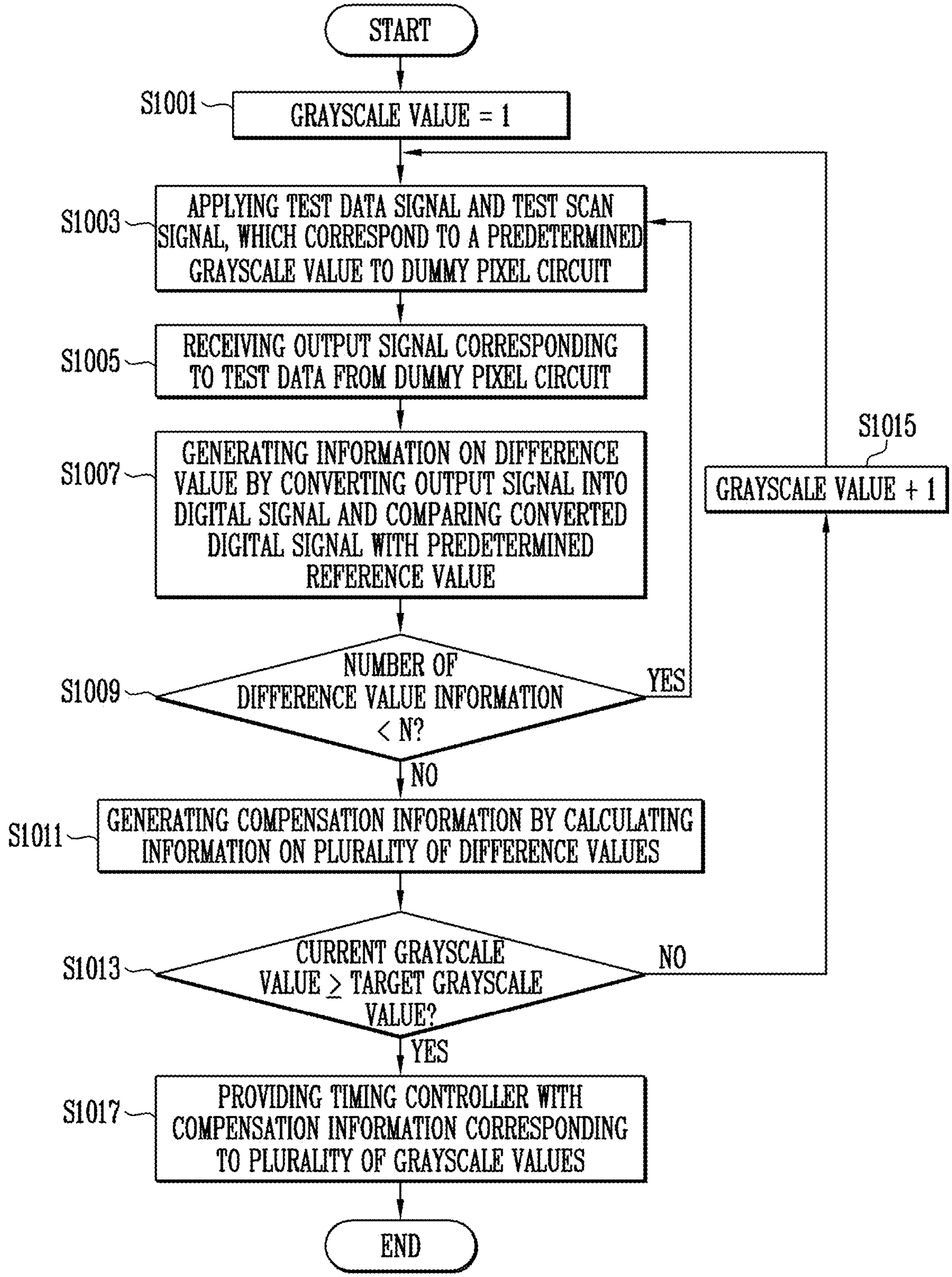
FIG. 10 is a flowchart illustrating a data compensation operation performed by the sensing unit in accordance with an embodiment of the present disclosure.

FIG. 10 is a flowchart illustrating a data compensation operation performed by the sensing unit 150 in accordance with an embodiment of the present disclosure.

In some embodiments, the sensing unit 150 may generate compensation information on each of a plurality of grayscale values which the display can express.

In step S1001, the sensing unit 150 may set an initial grayscale value as 1.

In step S1003, the sensing unit 150 may provide the dummy pixel circuit with a test data signal and a test scan signal, which corresponds to a predetermined grayscale value.

In step S1005, the sensing unit 150 may receive an output signal corresponding to test data from the dummy pixel circuit.

In step S1007, the sensing unit 150 may convert the output signal into a digital signal, and generate information on a difference value between the converted digital signal and a reference value by comparing the converted digital signal with the reference value.

In step S1009, the sensing unit 150 may determine whether a number of difference value information is smaller than predetermined N. When it is determined that the number of difference value information is smaller than N, the sensing unit 150 may again perform the step S1003. That is, the sensing unit 150 may generate information on N difference values by providing a test signal to the dummy pixel circuit through N-time repetition of the step S1003 with respect to the same grayscale value.

When it is determined that the number of difference value information is not smaller than N, the sensing unit 150 may generate compensation information by calculating information on a plurality of difference values (S1011). Specifically, the sensing unit 150 may perform the calculation operation described with reference to FIGS. 8A and 8B.

In step S1013, the sensing unit 150 may determine whether a current grayscale value is greater than or equal to a target grayscale value. The target grayscale value may be set as a grayscale corresponding to a brightest luminance which the display device can display. For example, the target grayscale may correspond to a white grayscale.

When it is determined that the current grayscale value is not greater than the target grayscale value, the sensing unit 150 may perform a compensation information generating operation on a next grayscale value (S1015).

When it is determined that the current grayscale value is greater than or equal to the target grayscale value, the sensing unit 150 may suspend the compensation information generating operation.

In step S1017, the sensing unit 150 may provide the timing controller with compensation information corresponding to a plurality of grayscale values.

In the display device in accordance with the present disclosure, an accurate compensation value can be sensed without noise, in sensing for compensation according to driving time accumulation of the pixel circuit.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method for driving a display device including a display area including a plurality of pixels and a non-display area including a dummy pixel, the method comprising steps of:

inputting, to the dummy pixel, a test data signal for sensing an output signal corresponding to predetermined test data for each predetermined time;

performing an operation of generating compensation information for compensating for degradation according to a driving time of at least one of a light emitting element and a driving transistor, which are included in each of the pixels, based on the output signal output from the dummy pixel;

accumulating and storing the compensation information for each predetermined time, and generating compensated data by compensating for data input from outside according to the stored compensation information; and allowing the light emitting element included in each of the pixels to emit light with a grayscale corresponding to the compensated data, wherein the display device includes a scan driver supplying scan signals to scan lines, a data driver supplying data signals to data lines, and a sensing unit separate from the scan driver and the data driver, wherein the dummy pixel further comprises a sensing control transistor comprising a gate electrode directly connected to the sensing unit and a first electrode connected to an anode electrode of a dummy light emitting element, and a dummy switching transistor comprising a gate electrode directly connected to the sensing unit and a first electrode directly connected to the sensing unit, and wherein each of the pixels further comprises a sensing transistor, and the sensing transistor in each of the pixels is maintained in a turn-off state during an operation of the pixels.

2. The method of claim 1, wherein the dummy pixel is continuously driven and degraded while the display device is driven, and wherein the generating of the compensation information is accomplished by generating the compensation information on the dummy pixel for each predetermined time.

3. The method of claim 1, wherein the dummy pixel includes:

a dummy driving transistor and a dummy light emitting element, connected in series between a first power source and a second power source;

a dummy switching transistor connected between a gate of the dummy driving transistor and a test data line to which the test data signal is transferred; and a storage capacitor connected between the gate of the dummy driving transistor and the first power source, wherein the performing of the operation of generating the compensation information is accomplished by:

transferring the test data signal through the test data line, turning on the dummy switching transistor by applying a test scan signal to a gate of the dummy switching transistor, to store a voltage corresponding to the test data signal in the gate of the dummy driving transistor and the storage capacitor, and turning on the sensing control transistor by applying a sensing control signal to the gate electrode of the sensing control transistor, to output a voltage of the anode electrode of the dummy light emitting element as a test output signal.

4. The method of claim 1, further comprising a step of generating data signals based on the compensated data and then providing the data signals to the pixels.

5. The method of claim 1, wherein the inputting of the test data signal is accomplished by:

generating a plurality of test data respectively corresponding to a plurality of predetermined grayscale values, and inputting a plurality of test data signals corresponding to the plurality of test data to the dummy pixel, and wherein the generating of the compensated data includes performing an operation of generating compensation information corresponding to each of the plurality of grayscale values, based on a plurality of output signals corresponding to each of the plurality of test data output from the dummy pixel.

6. The method of claim 1, wherein the dummy pixel is formed on a same substrate as the pixels through a same process as the pixels at a same time as the pixels.

7. The method of claim 1, wherein the inputting of the test data signal is accomplished by generating the test data signal and repeatedly providing the test data signal to the dummy pixel by a predetermined number of times, and wherein the generating of the compensation information is accomplished by generating the test data signal and repeatedly providing the test data signal to the dummy pixel by a predetermined number of times, and wherein the generating of the compensation information is accomplished by:

generating a digital signal corresponding to the output signal output from the dummy pixel by converting the output signal, generating information on a difference value between the digital signal and a predetermined reference value by comparing the digital signal with the reference value, and generating the compensation information based on information on a plurality of difference values corresponding to the predetermined number of times.

8. The method of claim 7, wherein the generating of the compensation information is accomplished by performing a calculation operation for generating the compensation information based on the information on the plurality of difference values, and wherein the performing of the calculation operation is accomplished by:

aligning information on a plurality of difference values corresponding to the predetermined number of times according to an order in which the information on the plurality of difference values are received, forming a plurality of groups by sequentially selecting m difference values among the plurality of aligned difference values according to an order in which the m difference values are aligned, deriving a median value among difference values included in each of the plurality of groups, and deriving an average value of median values respectively derived from the plurality of groups.

9. The method of claim 8, wherein the non-display area includes a plurality of dummy pixels, and wherein the generating of the compensation information is accomplished by performing the calculation operation on each of the plurality of dummy pixels, and then generating the compensation information based on a result obtained by performing the calculation operation on each of the plurality of dummy pixels.

10. The method of claim 9, wherein the display device includes a compensation information storage unit therein, wherein the compensation information storage unit stores the compensation information, and wherein the generating of the compensated data is accomplished by generating the compensated data by compensating for the data input from the outside based on the compensation information stored in the compensation information storage unit.

11. A display device including a display area and a non-display area, the display device comprising:

a scan driver supplying scan signals to scan lines;

a data driver supplying data signals to data lines;

pixels included in the display area, the pixels each including a light emitting element emitting light with a grayscale corresponding to data input from outside and a driving transistor;

a dummy pixel included in the non-display area, the dummy pixel including a dummy light emitting element and a dummy driving transistor;

a sensing unit separate from the scan driver and the data driver, configured to input, to the dummy pixel, a test data signal for sensing an output signal corresponding to predetermined test data for each predetermined time, and then perform an operation of generating compensation information for compensating for degradation according to a driving time of at least one of the light emitting element and the driving transistor, based on the output signal output from the dummy pixel; and a timing controller configured to accumulate and store the compensation information received from the sensing unit for each predetermined time, and generate compensated data by compensating for the data input from the outside according to the stored compensation information, wherein the dummy pixel further comprises a sensing control transistor comprising a gate electrode directly connected to the sensing unit and a first electrode connected to an anode electrode of the dummy light emitting element, and a dummy switching transistor comprising a gate electrode directly connected to the sensing unit and a first electrode directly connected to the sensing unit, and wherein each of the pixels further comprises a sensing transistor, the sensing transistor in each of the pixels being maintained in a turn-off state during an operation of the pixels.

12. The display device of claim 11, wherein the sensing unit includes:

a sensing controller configured to generate the test data signal and repeatedly provide the test data signal to the dummy pixel by a predetermined number of times;

a converter configured to receive the output signal from the dummy pixel, and then generate a digital signal corresponding to the output signal by converting the output signal; and a comparator configured to generate information on a difference value between the digital signal and a predetermined reference value by comparing the digital signal with the reference value, and wherein the sensing controller receives, from the comparator, information on a plurality of difference values corresponding to the predetermined number of times, and generates the compensation information based on the information on the plurality of difference values.

13. The display device of claim 12, wherein the dummy pixel includes:

a dummy switching transistor connected between a test data line to which the test data signal output from the sensing controller is transferred and a gate of the dummy driving transistor to transfer the test data signal to the gate of the dummy driving transistor; and a storage capacitor connected between the gate of the dummy driving transistor and a first power source to store a voltage corresponding to the test data signal, wherein the dummy driving transistor is connected between the first power source and an anode electrode of the light emitting element, wherein a cathode electrode of the light emitting element is connected to a second power source, and wherein the sensing unit turns on the dummy switching transistor by applying a test scan signal to a gate of the dummy switching transistor when the operation of generating the compensation information is performed, to transfer the test data signal to the gate of the dummy driving transistor and the storage capacitor, and turns on the sensing control transistor by applying a sensing control signal to the gate electrode of the sensing control transistor, to output a voltage of the anode electrode of the dummy light emitting element as an output signal to the sensing unit.

14. The display device of claim 11, wherein the dummy pixel is continuously driven corresponding to the grayscale and degraded while the display device is driven, and wherein the sensing unit performs an operation of generating the compensation information on the dummy pixel for each predetermined time.

15. The display device of claim 14, wherein the sensing unit performs an operation of generating a plurality of test data signals respectively corresponding to a plurality of predetermined grayscale values and generating compensation information corresponding to each of the plurality of grayscale values.

16. The display device of claim 11, further comprising a data driver configured to generate data signals based on the compensated data received from the timing controller, and then provide the data signals to the pixels.

17. The display device of claim 11, wherein the dummy pixel is formed on a same substrate as the pixels through a same process as the pixels at a same time as the pixels.

18. An electronic device comprising:

a processor providing input image data;

a display device displaying an image based on the input image data, and including a display area and a non-display area, wherein the display device comprises:

pixels included in the display area, the pixels each including a light emitting element emitting light with a grayscale corresponding to data input from outside and a driving transistor;

a dummy pixel included in the non-display area, the dummy pixel including a dummy light emitting element and a dummy driving transistor;

a sensing unit configured to input, to the dummy pixel, a test data signal for sensing an output signal corresponding to predetermined test data for each predetermined time, and then perform an operation of generating compensation information for compensating for degradation according to a driving time of at least one of the light emitting element and the driving transistor, based on the output signal output from the dummy pixel; and a timing controller configured to accumulate and store the compensation information received from the sensing unit for each predetermined time, and generate compensated data by compensating for the data input from the outside according to the stored compensation information, wherein the sensing unit includes:

a sensing controller configured to generate the test data signal and repeatedly provide the test data signal to the dummy pixel by a predetermined number of times;

a converter configured to receive the output signal from the dummy pixel, and then generate a digital signal corresponding to the output signal by converting the output signal; and a comparator configured to generate information on a difference value between the digital signal and a predetermined reference value by comparing the digital signal with the reference value, and wherein the sensing controller receives, from the comparator, information on a plurality of difference values corresponding to the predetermined number of times, and generates the compensation information based on the information on the plurality of difference values, wherein the sensing controller performs a calculation operation for generating the compensation information based on the information on the plurality of difference values in the operation of generating the compensation information, and wherein the calculation operation is accomplished by:

aligning information on a plurality of difference values corresponding to the predetermined number of times according to an order in which the information on the plurality of difference values are received from the comparator, forming a plurality of groups by sequentially selecting m difference values among the plurality of aligned difference values according to an order in which the m difference values are aligned, and deriving a median value among difference values included in each of the plurality of groups and then deriving an average value of median values respectively derived from the plurality of groups.

19. The electronic device of claim 18, wherein the non-display area includes a plurality of dummy pixels, and wherein the sensing controller performs the calculation operation on each of the plurality of dummy pixels, and then generates the compensation information based on a result obtained by performing the calculation operation on each of the plurality of dummy pixels.

20. The electronic device of claim 19, wherein the timing controller includes a compensation information storage unit configured to store the compensation information received from the sensing unit, and generates the compensated data by compensating for the data input from the outside based on the compensation information stored in the compensation information storage unit.

* * * * *